(12) United States Patent
Hu et al.

(10) Patent No.: US 7,790,809 B2
(45) Date of Patent: Sep. 7, 2010

(54) THERMOPLASTIC VULCANIZATES WITH ADVANTAGEOUS ADHESION TO POLAR SUBSTRATES

(75) Inventors: Weiguo Hu, Hadley, MA (US); Jim Lee Johnson, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 896 days.

(21) Appl. No.: 11/510,999

(22) Filed: Aug. 28, 2006

(65) Prior Publication Data

US 2008/0051516 A1     Feb. 28, 2008

(51) Int. Cl.
*C08L 23/00* (2006.01)
*C08L 23/04* (2006.01)
*C08L 23/10* (2006.01)

(52) U.S. Cl. .................. 525/191; 525/232; 525/240

(58) Field of Classification Search ................ 525/191, 525/232, 240
See application file for complete search history.

(56) References Cited

U.S. PATENT DOCUMENTS

| | | | |
|---|---|---|---|
| 4,957,968 A | 9/1990 | Adur et al. | |
| 6,503,984 B2 | 1/2003 | Johnson et al. | |
| 6,893,590 B1 | 5/2005 | Rigosi et al. | |
| 2005/0131154 A1 | 6/2005 | Cai et al. | |
| 2005/0287339 A1 | 12/2005 | Leatherman | |
| 2006/0135699 A1 | 6/2006 | Li et al. | |

FOREIGN PATENT DOCUMENTS

| | | |
|---|---|---|
| EP | 1655331 | 5/2006 |
| EP | 1688459 | 8/2006 |
| WO | WO 00/37553 | 6/2000 |
| WO | WO 02/055599 | 7/2002 |

OTHER PUBLICATIONS

Exxon Mobil tradesheet for Exxelor PO 1015 TM 6/3/9, evidence. http://matweb.com/search/datasheet.*

* cited by examiner

*Primary Examiner*—Nathan M Nutter

(57) ABSTRACT

A thermoplastic vulcanizate comprising (i) a dynamically-cured rubber, and (ii) a thermoplastic polymer component, where the thermoplastic polymer component includes (a) a propylene-α-olefin thermoplastic copolymer characterized by including at least 5% by weight up to 35% by weight units deriving from α-olefins, and having a heat of fusion, as determined by DSC, of less than 80 J/g, (b) and a functionalized thermoplastic polymer.

26 Claims, No Drawings

US 7,790,809 B2

THERMOPLASTIC VULCANIZATES WITH ADVANTAGEOUS ADHESION TO POLAR SUBSTRATES

FIELD OF THE INVENTION

One or more embodiments of the present invention are directed toward thermoplastic vulcanizates with advantageous adhesion to polar substrates.

BACKGROUND OF THE INVENTION

Thermoplastic vulcanizates include blends of dynamically cured rubber and thermoplastic polymers. The rubber may be dispersed within the thermoplastic resin phase as finely-divided rubber particles. These compositions have advantageously demonstrated many of the properties of thermoset elastomers, yet they are processable as thermoplastics.

The ability to adhere these compositions to polar surfaces, however, has presented technological challenges. U.S. Pat. No. 4,957,968 teaches thermoplastic vulcanizates that include a functionalized polyolefin. For example, these thermoplastic vulcanizates may include polypropylene grafted with maleic anhydride. These thermoplastic vulcanizates, which may be partially or completely crosslinked, demonstrate useful adhesion to metal surfaces.

U.S. Pat. No. 6,503,984 teaches thermoplastic vulcanizates that exhibit improved adhesion to polar polymers and metals. These thermoplastic vulcanizates include a first polyolefin that is characterized by a low crystallinity (e.g., 10-32 weight percent) and low flexural modulus (e.g., 34.5-138 MPa), and a second polyolefin including a functionalized polyolefin (e.g., maleated polypropylene). The first polyolefin may include homopolymers with low crystallinity due to random or regular variations in tacticity, copolymers that have low crystallinity due to comonomer and/or random or regular variations in tacticity (including blocky homo and copolymers), and polymers prepared by blending or grafting together oligomers or polymers.

Inasmuch as there is continued demand for thermoplastic vulcanizates that exhibit technologically useful adherence to polar surfaces, there remains a need to improve upon these compositions.

SUMMARY OF THE INVENTION

One or more embodiments of the present invention include a thermoplastic vulcanizate comprising (i) a dynamically-cured rubber, and (ii) a thermoplastic polymer component, where the thermoplastic polymer component includes (a) a propylene-α-olefin thermoplastic copolymer characterized by including at least 5% by weight up to 35% by weight units deriving from α-olefins, and having a heat of fusion, as determined by DSC, of less than 80 J/g, and (b) a functionalized thermoplastic polymer.

One or more embodiments of the present invention also include a method for preparing a thermoplastic vulcanizate, the method comprising dynamically vulcanizing a rubber within a mixture with a thermoplastic polymer component, where the thermoplastic polymer component includes (a) a thermoplastic propylene-α-olefin copolymer characterized by including at least 5% by weight up to 35% by weight units deriving from α-olefins, and having a heat of fusion, as determined by DSC, of less than 80 J/g, and (b) a functionalized thermoplastic polymer.

DETAILED DESCRIPTION OF THE INVENTION

One or more embodiments of the present invention are directed toward thermoplastic vulcanizates that include (i) a crosslinked or cured phase and (ii) an uncrosslinked or uncured phase. The crosslinked phase includes a dynamically cured rubber, and the uncrosslinked phase includes propylene-α-olefin copolymer and a functionalized thermoplastic polymer. The uncrosslinked phase may be referred to as a thermoplastic polymer component. In addition, the uncrosslinked phase may include other thermoplastic polymers and/or tackifier resins such as functionalized tackifier resin.

Rubber

Rubbers include polymers that are capable of being dynamically crosslinked. Reference to a rubber may include mixtures of more than one rubber. Non-limiting examples of useful rubbers include olefinic elastomeric copolymers, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof. In one or more embodiments, olefinic elastomeric copolymers include ethylene-propylene rubbers, propylene-based rubbery copolymers, and/or ethylene-based plastomers.

Ethylene-Propylene Rubber

In one or more embodiments, ethylene-propylene rubbers include copolymers polymerized from ethylene, at least one α-olefin monomer, and optionally at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

In one or more embodiments, the ethylene-propylene rubbers include from about 12 to about 85% by weight, or from about 20 to about 80% by weight, or from about 40 to about 70% by weight, and or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units (such as propylene) deriving from α-olefin monomer. Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene, the copolymer may include at least 3% by weight, in other embodiments at least 5% by weight, and in other embodiments at least 8% by weight units deriving from 5-ethylidene-2-norbornene.

In one or more embodiments, the ethylene-propylene rubbers have a weight average molecular weight ($M_w$) that is greater than 50,000, in other embodiments greater than 100,000, in other embodiments greater than 200,000, and in other embodiments greater than 300,000; and the weight average molecular weight of the ethylene-propylene rubbers of one embodiment is less than 1,200,000, in other embodiments less than 1,000,000, in other embodiments less than 900,000, and in other embodiments less than 800,000. In one or more embodiments, useful ethylene-propylene rubber has a number average molecular weight ($M_n$) that is greater than 20,000, in other embodiments greater than 60,000, in other embodiments greater than 100,000, and in other embodiments greater than 150,000; and the number average molecular weight of the ethylene-propylene rubber of one or more embodiments is less than 500,000, in other embodiments less than 400,000, in other embodiments less than 300,000, and in other embodiments less than 250,000.

In one or more embodiments, ethylene-propylene rubber may also be characterized by having a Mooney viscosity ($ML_{(1+4)}$ at 125° C.) per ASTM D 1646, of from about 25 to about 500 or from about 50 to about 450. Where higher molecular weight rubbers are employed within the thermoplastic vulcanizates of this invention, these high molecular weight polymers may be obtained in an oil-extended form. These oil-extended copolymers typically include from about 15 to about 100 parts by weight, per 100 parts by weight rubber, of a paraffinic oil. The Mooney viscosity of these oil-extended copolymers may be from about 35 to about 80 or from about 45 to about 70.

In one or more embodiments, ethylene-propylene rubber may be characterized by having an intrinsic viscosity, as measured in Decalin at 135° C., up from about 2 to about 8 dl/g, or from about 3 to about 7 dl/g, or from about 4 to about 6.5 dl/g.

Ethylene-propylene rubber may be manufactured or synthesized by using a variety of techniques. For example, these copolymers can be synthesized by employing solution, slurry, or gas phase polymerization techniques that employ numerous catalyst systems including Ziegler-Natta systems, single-site catalysts including vanadium catalysts and Group IV-VI metallocenes, and Brookhart catalysts. Elastomeric copolymers are commercially available under the tradenames Vistalon™ (ExxonMobil Chemical Co.; Houston, Tex.), Keltan™ (DSM Copolymers; Baton Rouge, La.), Nordel™ IP (DuPont Dow Elastomers; Wilmington, Del.), Nordel MG™ (DuPont Dow Elastomers), Royalene™ (Chemtura) and Buna™ (Lanxess).

Propylene-Based Rubbery Copolymers

In one or more embodiments, the propylene-based rubbery copolymer, which may also be referred to as propylene-α-olefin copolymers, includes one or more units derived from propylene (i.e., mer units), one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or combinations thereof.

The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units (i.e., ethylene mer units deriving from the polymerization of ethylene); in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, α-olefin derived units, and diene-derived units. Stated another way, the propylene-based rubbery copolymers may include at least 75% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived and diene-derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the melt temperature of the propylene-based rubbery copolymer is less than 110° C., in other embodiments less than 90° C., in other embodiments less than 80° C., and in other embodiments less than 70° C.; in these or other embodiments, the propylene-based rubbery copolymer has a melt temperature of at least 25° C., in other embodiments at least of 35° C., in other embodiments at least of 40° C., and in other embodiments at least of 45° C.

In one or more embodiments, the propylene-based rubbery copolymer may be characterized by a heat of fusion (Hf), as determined according to DSC procedures according to ASTM E 793. This may be determined by placing 6 to 10 mg of sample into DSC equipment and heating the sample at about 10° C./min. In one or more embodiments, the propylene-based rubbery copolymer may be characterized by a heat of fusion that is at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based rubbery copolymer may be characterized by a heat of fusion that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of three propylene units, as measured by $^{13}$C NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication 2004/0236042.

In one or more embodiments, the propylene-based rubbery copolymer may have a % crystallinity of from 0.5 to 40, in other embodiments 1 to 30, and in other embodiments 5 to 25. Crystallinity may be determined according to DSC procedures in accordance with ASTM E-794-95. This may be determined by placing 6 to 10 mg of sample into DSC equipment and heating the sample at about 10° C./min. For use herein, the crystallinity of the propylene-ethylene polymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%.

In one or more embodiments, the propylene-based rubbery copolymer can have a density of about 0.85 g/cm$^3$ to about 0.92 g/cm$^3$, in other embodiments about 0.87 g/cm$^3$ to 0.90 g/cm$^3$, and in other embodiments from about 0.88 g/cm$^3$ to about 0.89 g/cm$^3$ at room temperature as measured per the ASTM D-792 test method.

In one or more embodiments, the propylene-based rubbery copolymer can have a melt index in dg/min (MI, 2.16 kg @ 190° C.), according to ASTM D-1238 (B), of less than 10, in other embodiments≦6.5, in other embodiments≦6, in other embodiments≦5.5, and in other embodiments≦5.

In one or more embodiments, the propylene-based rubbery copolymer can have a melt flow rate (MFR, 2.16 kg weight @ 230° C.), as measured according to the ASTM D-1238 (A), equal to or greater than 0.2 dg/min, in other embodiments at least 0.2 dg/min, in other embodiments at least 0.5 dg/min, and in other embodiments at least 1.0 dg/min. In these or other embodiments, the MFR may be equal to or less than 350 dg/min, and in other embodiments less than 100 dg/min. In an embodiment, the propylene-based polymer has an MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-based rubbery copolymers may have a Mooney viscosity [ML (1+4) @ 125° C.], as determined according to ASTM D1646, of less than 100, in other embodiments less than 75, in other embodiments less than 60, and in other embodiments less than 30.

In one or more embodiments, the propylene-based rubbery copolymer can have a weight average molecular weight ($M_w$) of about 5,000 to about 5,000,000 g/mole, in other embodiments a $M_w$ of about 10,000 to about 1,000,000 g/mole, in other embodiments a $M_w$ of about 20,000 to about 500,000, and in other embodiments a $M_w$ of about 50,000 to about 400,000 g/mole.

In one or more embodiments, the propylene-based rubbery copolymer can have a number average molecular weight ($M_n$) of about 2,500 to about 2,500,000 g/mole, in other embodiments a $M_n$ of about 5,000 to about 500,000 g/mole, in other embodiments a $M_n$ of about 10,000 to about 250,000, and in other embodiments a $M_n$ of about 25,000 to about 200,000 g/mole.

In one or more embodiments, the propylene-based rubbery copolymer can have a Z-average molecular weight ($M_z$) of about 10,000 to about 7,000,000 g/mole, in other embodiments a $M_z$ of about 50,000 to about 1,000,000 g/mole, in other embodiments a $M_z$ of about 80,000 to about 700,000 g/mole, and in other embodiments a $M_z$ of about 100,000 to about 500,000 g/mole.

In one or more embodiments, the molecular weight distribution index (MWD=($M_w/M_n$)) of the propylene-based rubbery copolymer may be about 1 to about 40, in other embodiments about 1 to about 5, in other embodiments about 1.8 to about 5, and in other embodiments about 1.8 to about 3. Techniques for determining the molecular weight (Mn and Mw) and molecular weight distribution (MWD) may be found in U.S. Pat. No. 4,540,753 (Cozewith, Ju and Verstrate) (which is incorporated by reference herein for purposes of U.S. practice) and the references cited therein and in 21 MACROMOLECULES, 3360 (1988) (Verstrate et al.) (which is herein incorporated by reference for purposes of U.S. practice) and references cited therein. Molecular weight may be determined by size exclusion chromatography (SEC) by using a Waters 150 gel permeation chromatograph equipped with the differential refractive index detector and calibrated using polystyrene standards.

In one or more embodiments, the ethylene-based plastomers, which may also be referred to as ethylene-α-olefin copolymers, include copolymers of ethylene and one or more α-olefin comonomers. The α-olefin comonomers may include 1-butene, 1-hexene, 1-octene, 1-nonene, 1-decene, 4-methyl-1-pentene, and mixtures thereof.

Ethylene-based Plastomers

In one or more embodiments, the ethylene-based plastomers may include at least 15 weight percent, in other embodiments at least 30 weight percent, and in other embodiments at least 50 weight percent units deriving from the α-olefin comonomer based plastomers upon the total weight of the copolymer. In these or other embodiments, the ethylene-based plastomers may include less than 55 weight percent, in other embodiments less than 45 weight percent, and in other embodiments less than 40 weight percent units deriving from the α-olefin comonomer based upon the total weight of the copolymer.

In one or more embodiments, the ethylene-based plastomers may be characterized by a density, as determined at room temperature per ASTM D-792, that is less than 0.900 g/cc, in other embodiments less than 0.870 g/cc, in other embodiments less than 0.865 g/cc, and in other embodiments less than 0.860 g/cc; in these or other embodiments, the ethylene-α-olefin copolymers may be characterized by a density of at least 0.850 g/cc, and in other embodiments at least 0.860 g/cc.

In one or more embodiments, the ethylene-based plastomers may be characterized by a glass transition temperature (Tg), as determined by DSC, that is less than −20° C., in other embodiments less than −30° C., in other embodiments less than −50° C., and in other embodiments from about −20° C. to about −60° C.

In one or more embodiments, the ethylene-based plastomers can have a MI in dg/min (2.16 kg @ 190° C. ASTM 1238 (B)), of less than 100, in other embodiments less than 50, in other embodiments less than 35, in other embodiments less than 15, and in other embodiments from about 0.1 to about 100.

In one or more embodiments, the ethylene-based plastomers may be characterized by a narrow Compositional Distribution Breadth index, as determined by using the procedure set forth in WO 93/03093, above 60%, in other embodiments above 75%, and in other embodiments above 90%.

Thermoplastic Phase

As noted above, the uncrosslinked phase (ii) includes a propylene-α-olefin thermoplastic copolymer and a functionalized thermoplastic polymer. The uncrosslinked phase may also optionally include other thermoplastic polymers such as a low-crystallinity thermoplastic polymer, as well as other optional constituents. Inasmuch as the uncrosslinked phase is not crosslinked, at least not to an appreciable extent, the uncrosslinked phase can flow at temperatures above the $T_g$ or $T_m$ of the polymers included thereof.

Propylene-α-olefin Copolymer

In one or more embodiments, the propylene-α-olefin copolymer includes one or more units derived from propylene and one or more comonomer units (i.e., mer units) derived from ethylene or α-olefins including from 4 to about 20 carbon atoms. In one or more embodiments, the comonomer units derive from ethylene, butene, hexane, and/or octene. The embodiments described below are discussed with reference to ethylene as the comonomer, but the embodiments are equally applicable to other α-olefin comonomers including butene, hexene or octene. In this regard, the copolymer may be referred to as a propylene-ethylene copolymer.

In one or more embodiments, the propylene-ethylene copolymers may include at least 5% by weight, in other embodiments at least 6% by weight, in other embodiments at least 8% by weight, and in other embodiments at least 10% by weight ethylene-derived units. In these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived and ethylene-derived units. Stated another way, the homogeneous propylene-ethylene copolymers may include at least 75% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived and ethylene-derived units.

In one or more embodiments, the propylene-ethylene copolymer includes less than 0.5% by weight (including zero), in other embodiments less than 0.1% by weight, in other embodiments less than 0.05% by weight, or in other embodiments less than 0.01% by weight diene-derived units. In one or more embodiments, the propylene-ethylene copolymer is substantially devoid or substantially free of diene-derived units, where substantially devoid refers to that amount of diene-derived units or less that has no appreciable impact on the copolymer. In one or more embodiments, the propylene-ethylene copolymers are devoid of diene-derived units. In one or more embodiments, these propylene-ethylene copolymers may be referred to as non-crosslinkable propylene-ethylene copolymer.

The propylene-ethylene copolymers in one or more embodiments of this invention are characterized by having a single melting temperature as determined by differential scanning calorimetry (DSC). The melting point is defined as the temperature of the greatest heat absorption within the range of melting of the sample. The propylene-ethylene polymer may show secondary melting peaks adjacent to the principal peak, but for purposes herein, these secondary melting peaks are considered together as a single melting point, with the highest of these peaks being considered the melting point ($T_m$) of the propylene-ethylene copolymer. In one or more embodiments, the $T_m$ of the ethylene-propylene copolymer is less than 110° C., in other embodiments less than 90° C., in other embodiments less than 80° C., and in other embodiments less than 70° C.; in these or other embodiments, the ethylene-propylene copolymer has a $T_m$ of at least 25° C., in other embodiments at least of 35° C., in other embodiments at least of 40° C., and in other embodiments at least of 45° C.

In one or more embodiments, the propylene-ethylene copolymer may be characterized by a heat of fusion (Hf), as determined according to DSC procedures. In one or more embodiments, the propylene-ethylene copolymer may be characterized by a $H_f$ that is at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-ethylene copolymer may be characterized by a $H_f$ that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-ethylene copolymer can have a triad tacticity of three propylene units, as measured by $^{13}C$ NMR, of 75%, or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the propylene-ethylene copolymer may have a % crystallinity of from 0.5 to 40, in other embodiments 1 to 30, and in other embodiments 5 to 25. Crystallinity may be determined according to DSC procedures. For use herein, the crystallinity of the propylene-ethylene polymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%.

In one or more embodiments, the propylene-ethylene copolymer can have a density of about 0.85 g/cm³ to about 0.92 g/cm³, in other embodiments about 0.87 g/cm³ to 0.90 g/cm³, and in other embodiments from about 0.88 g/cm³ to about 0.89 g/cm³ at room temperature as measured per the ASTM D-1505 test method.

In one or more embodiments, the propylene-ethylene copolymer can have a MI in dg/min (ASTM D-1238(B); 2.16 kg @ 190° C.), of less than 7, in other embodiments≦6.5, in other embodiments≦6, in other embodiments≦5.5, and in other embodiments≦5.

In one or more embodiments, the propylene-ethylene copolymer can have a MFR (ASTM D-1238(A); 2.16 kg weight @ 230° C.), equal to or greater than 0.2 dg/min, in other embodiments of at least 0.2 dg/min, in other embodiments at least 0.5 dg/min, and in other embodiments at least 1.0 dg/min. In these or other embodiments, the MFR may be equal to or less than 200 dg/min, and in other embodiments less than 100 dg/min. In an embodiment, the propylene-based polymer has an MFR of 0.5 dg/min to 200 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-ethylene copolymer may have a Mooney viscosity [ML (1+4) @ 125° C.], as determined according to ASTM D1646, of less than 100, in other embodiments less than 75, in other embodiments less than 60, and in other embodiments less than 30.

In one or more embodiments, the propylene-ethylene copolymer can have a weight average molecular weight ($M_w$) of about 5,000 to about 5,000,000 g/mole, in other embodiments a $M_w$ of about 10,000 to about 1,000,000, in other embodiments a $M_w$ of about 20,000 to about 500,000, and in other embodiments a $M_w$ of about 50,000 to about 400,000.

In one or more embodiments, the propylene-ethylene copolymer can have a number average molecular weight ($M_n$) of about 2,500 to about 2,500,000 g/mole, in other embodiments a $M_n$ of about 5,000 to about 500,000, in other embodiments a $M_n$ of about 10,000 to about 250,000, and in other embodiments a $M_n$ of about 25,000 to about 200,000.

In one or more embodiments, the propylene-ethylene copolymer can have a Z-average molecular weight ($M_z$) of about 10,000 to about 7,000,000 g/mole, in other embodiments a $M_z$ of about 50,000 to about 1,000,000, in other embodiments a $M_z$ of about 80,000 to about 700,000, and in other embodiments a $M_z$ of about 100,000 to about 500,000.

In one or more embodiments, the molecular weight distribution index (MWD=(Mw/Mn)) of the propylene-ethylene copolymer may be about 1 to about 40, in other embodiments about 1 to about 5, in other embodiments about 1.8 to about 5, and in other embodiments about 1.8 to about 3. Techniques for determining the molecular weight (Mn and Mw) and molecular weight distribution (MWD) may be found in U.S. Pat. No. 4,540,753 (Cozewith, Ju and Verstrate) (which is incorporated by reference herein for purposes of U.S. practice) and references cited therein and in 21 MACROMOLECULES 3360 (1988) (Verstrate et al.) (which is herein incorporated by reference for purposes of U.S. practice) and references cited therein.

Propylene-ethylene copolymers used in the present invention are available commercially under the tradenames Vistamaxx™ (ExxonMobil Chemical Company, Houston, Tex., USA) and Versify™ (The Dow Chemical Company, Midland, Mich., USA).

In one or more embodiments, the propylene-ethylene copolymer may be functionalized. In other words, the propylene-ethylene copolymer may include at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, epoxide, or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the propylene-ethylene copolymer. In one or more embodiments, the functionalized propylene-ethylene copolymer may be prepared by using methods set forth in U.S. Pat. No. 6,884,850.

Functionalized Thermoplastic Polymer

As noted above, the uncrosslinked phase also includes a functionalized thermoplastic polymer. The functionalized thermoplastic polymer includes a polymer distinct from the propylene-α-olefin thermoplastic copolymer and includes at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, epoxide, or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the thermoplastic polymer.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5,624,999, and 6,503,984.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a $M_w$ of from about 100 kg/mole to about 2,000 kg/mole, and in other embodiments from about 300 kg/mole to about 600 kg/mole. They may also characterized by a $M_n$ of about 80 kg/mole to about 800 kg/mole, and in other embodiments about 90 kg/mole to about 200 kg/mole.

In one or more embodiments, these thermoplastic polymer, prior to grafting, may be characterized by a MFR (ASTM D-1238; 2.16 Mg @ 230° C.) of from about 0.3 to about 2,000 dg/min, in other embodiments from about 0.5 to about 1,000 dg/min, and in other embodiments from about 1 to about 1,000 dg/min.

In one or more embodiments, these thermoplastic resins, prior to grafting, may have $T_m$ that is from about 110° C. to about 250° C., in other embodiments from about 120 to about 170° C., and in other embodiments from about 130° C. to about 165° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Other polyolefin copolymers may include copolymers of olefins with styrene such as styrene-ethylene copolymer or polymers of olefins with α,β-unsaturated acids, or α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta-type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight percent of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight percent functionalization, in these or other embodiments, the functionalized thermoplastic polymers may include less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by an MFR (ASTM D-1238 (A) 2.16 kg @ 230° C.) of from about 20 to about 2,000 dg/min, in other embodiments from about 100 to about 1,500 dg/min, and in other embodiments from about 150 to about 750 dg/min. In one or more embodiments, where the functionalized thermoplastic polymer is a functionalized ethylene-based polymer, it can be characterized by an MFR (ASTM D-1238(A) 2.16 kg @ 190° C.) of from about 0.2 to about 2,000 dg/min, in other embodiments from about 1 to about 1,000 dg/min, and in other embodiments from about 5 to about 100 dg/min.

Functionalized thermoplastic polymers are commercially available. For example, maleated propylene-based polymers may be obtained under the tradename FUSABOND™ (DuPont), POLYBOND™ (Crompton), EXXELOR™ (ExxonMobil) or EPOLENE™ (Eastman).

Low-Crystallinity Thermoplastic Polymers

As noted above, the uncrosslinked phase may also include low-crystallinity thermoplastic polymers characterized by low crystallinity and low flex modulus. In one or more embodiments, low crystallinity thermoplastic polymers may include those thermoplastic polymers that may be characterized by a crystallinity that is less than 25%, in other embodiments less than 23%, and in other embodiments less than 20%; in these or other embodiments, the low-crystallinity thermoplastic polymer may be characterized by a crystallinity in excess of 2%, in other embodiments in excess of 3%, and in other embodiments in excess of 5%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In one or more embodiments, where the low-crystallinity thermoplastic polymer is propylene-based, the polymer may be characterized by a heat of fusion of less than 50 J/g, in other embodiments less than 40 J/g, and in other embodiments less than 30 J/g. Where the low-crystallinity thermoplastic polymer is ethylene-based, the polymer may be characterized by a heat of fusion of less than 160 J/g, in other embodiments less than 140 J/g, and in other embodiments less than 120 J/g.

In one or more embodiments, the low-crystallinity thermoplastic polymers may be characterized by a flexural modulus of less than 200 MPa, in other embodiments less than 150 MPa, in other embodiments less than 138 MPa, in other embodiments less than 130 MPa, and in certain embodiments from about 120 to about 110 MPa as determined according to ASTM-D 790A at 23° C. In view of the foregoing characteristics, the low-crystallinity thermoplastic polymer may also be referred to as low-flex modulus thermoplastic polymer.

In one or more embodiments, these low-crystallinity thermoplastic polymers may be characterized by a $T_m$ that is at least 100° C., in other embodiments at least 110° C., in other embodiments from at least 120° C., and in other embodiments at least 130° C.; in these or other embodiments, the $T_m$ may be less than 250° C., and in other embodiments less than 200° C. Melt temperature may be determined by differential scanning calorimetry.

In one or more embodiments, these low-crystallinity thermoplastic polymers may be characterized by a an MFR (ASTM D-1238 2.16 kg @ 230° C.) of from about 0.2 to about 1,000 dg/min, in other embodiments from about 0.5 to about 100 dg/min, and in other embodiments from about 1 to about 10 dg/min.

Exemplary low-crystallinity thermoplastic polymers include reactor blend polyolefins, impact copolymers, and mixtures thereof. These low-crystallinity thermoplastic polymers may be prepared by copolymerizing ethylene and/or α-olefins. This polymerization may include sequential or in-situ polymerization Low-crystallinity thermoplastic polymers are commercially available, for example, impact copolymers having a crystallinity of less than about 25 weight percent may be obtained under the tradename ADFLEX™ KS359P (Basell).

Blends that include about 84 weight percent ethylene-propylene rubber, about 5% by weight ethylene propylene copolymer, and about 11 percent by weight random polypropylene, with the overall blend having a crystallinity of about 5 to about 15%, can be obtained under the tradename SOFTELL™ CA02A (Basell).

Other Constituents

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 to about 9,000 g/mole, and in other embodiments from about 700 to about 1,300 g/mole. In one or more embodiments, these oligomers include isobutenyl mer units. Exemplary synthetic oils include polyisobutylene, poly(isobutylene-co-butene), polybutadiene, poly(butadiene-co-butene), and mixtures thereof. In one or more embodiments, synthetic oils may include polylinear α-olefins, poly-branched α-olefins, hydrogenated poly-α-olefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Sartomer). White synthetic oil is available under the tradename SPECTRASYN™ (ExxonMobil), formerly SHF Fluids (Mobil).

In one or more embodiments, the extender oils may include organic esters, alkyl ethers. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers.

In one or more embodiments, the thermoplastic vulcanizates of this invention may optionally include a functionalized tackifier resin. Functionalized tackifier resins, which may also be referred to as a functionalized hydrocarbon resin, include at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon resin.

In one or more embodiments, the functionalized tackifier resins include grafted hydrocarbon resins as disclosed in U.S. Patent Publication Nos. 2004/0260021 A1 and 2004/0266947 A1, which are incorporated herein by reference. Grafted hydrocarbon resins, which may also be referred to as grafted tackifier resins, may include grafted synthetic resins, grafted synthetic oligomers, and/or grafted natural resins, or a combination thereof. Grafted hydrocarbon resins can result from a grafting process, which includes combining, contacting, or reacting a hydrocarbon resin with a graft monomer.

The hydrocarbon resins that may be grafted may include natural resins, synthetic resins, and low molecular weight polymers or oligomers. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomer can include $C_8$, $C_9$, and $C_{10}$ aromatic monomer. Examples of aromatic monomer includes styrene, indene, derivatives of styrene, derivatives of indene, and combinations thereof.

Examples of these resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

The synthetic aliphatic or aromatic hydrocarbon resins that can be grafted may be characterized by a number average molecular weight ($M_n$) of from about 400 g/mole to about 3,000 g/mole, and in other embodiments from about 500 g/mole to about 2,000 g/mole. These hydrocarbon resins may also be characterized by a weight average molecular weight ($M_w$) of from about 500 g/mole to about 6,000 g/mole, and in other embodiments from about 700 g/mole to about 5,000 g/mole. Still further, these hydrocarbon resins may be characterized by a Z-average molecular weight of from about 700 g/mole to about 15,000 g/mole, and in other embodiments from about 8,000 g/mole to about 12,000 g/mole. Molecular weight may be determined by size exclusion chromatography (SEC) by using a Waters 150 gel permeation chromatograph equipped with the differential refractive index detector and calibrated using polystyrene standards.

In certain embodiments, the hydrocarbon resins include those produced by thermal polymerization of dicyclopentadiene (DCPD) or substituted DCPD, which may further include aliphatic or aromatic monomers. In one embodiment, the DCPD or substituted DCPD is copolymerized with aromatic monomer, and the final product includes less than 10% aromatic content. In another embodiment, the hydrocarbon resin derives from the copolymerization of both aliphatic monomer and aromatic monomer.

Grafted synthetic oligomers may include dimers, trimers, tetramers, pentamers, hexamers, septamers, and octamers of petroleum distillate monomer. In one or more embodiments, this petroleum distillate monomer may have a boiling point of from about 30° to about 210° C. The oligomers may include byproducts of resin polymerization including thermal and catalytic polymerization. For example, oligomers may derive from processes where DCPD, aliphatic monomer, and/or aromatic monomer are oligomerized and then grafted.

The hydrocarbon resins that can be grafted may include those characterized by an aromatic content of from about 1 to about 60%, in other embodiments from about 2 to about 40%, and in other embodiments from about 5 to about 10%. Also, the hydrocarbon resins that can be grafted may be at least partially hydrogenated. For example, the hydrocarbon resin prior to grafting may contain less than 90%, in other embodiments less than 50%, in other embodiments less than 25%, in other embodiments less than 10%, in other embodiments less than 2%, in other embodiments less than 1%, in other embodiments less than 0.5%, and in other embodiments less than 0.05% olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the graft monomers, which may be grafted to the hydrocarbon resin, may include unsaturated organic compounds containing at least one olefinic bond and at least one polar group. In certain embodiments, the organic compound may contain ethylenic unsaturation conjugated with a carbonyl group. Examples of graft monomers include acids, alcohols, anhydrides, imides, amides, and derivatives thereof including carboxylic acids, acid halides or anhydrides, alcohols (phenols, mono-alcohols, diols, and polyols), and derivatives thereof. Representative acids and acid derivatives include carboxylic acids, anhydrides, acid halides, esters, amides, imides and their salts, both metallic and non-metallic. Examples include maleic, fumaric, acrylic, methacrylic, itaconic, aconitic, citraconic, himic, tetrahydrophthalic, crotonic, α-methyl crotonic, and cinnamic acids. Particular examples include maleic anhydride, itaconic anhydride, citraconic anhydride, methyl acrylate, methyl methacrylate, ethyl acrylate, ethyl methacrylate, glycidyl acrylate, monoethyl maleate, diethyl maleate, dibutyl maleate, monomethyl fumarate, dimethyl fumarate, monomethyle itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylamaleimide, sodium acrylate, sodium methacrylate, potassium acrylate and potassium methacrylate.

Grafting of the grafting monomer to the hydrocarbon resin may take place in the presence of a free-radical initiator using suitable conditions. These processes are described in U.S. Patent Publication Nos. 2004/0260021 A1 and 2004/0266947 A1, which are incorporated herein by reference.

In one or more embodiments, the amount of grafting monomer combined with the hydrocarbon resin may be represented as a mole ratio of graft monomer to resin of from about 0.1:1 to about 1:1, in other embodiments from about 0.2:1 to about 0.9:1, and in other embodiments from about 0.3:1 to about 0.8:1. Where the grafting monomer is grafted to an oligomer, the amount of grafting monomer combined with the oligomer may be represented as a mole ratio of graft monomer to oligomer of from about 0.2:1 to about 5:1, in other embodiments from about 0.5:1 to about 3:1, and in other embodiments from about 0.8:1 to about 1.5:1.

The resulting grafted hydrocarbon resin may be characterized by a softening point of from about 15° C. to about 210° C., in other embodiments from about 65° C. to about 170° C., and in other embodiments from about 90° C. to about 140° C. Softening point can be determined according to ASTM E-28 (Revision 1996). In these or other embodiments, the resulting grafted hydrocarbon resin may be characterized by a $T_g$ of less than 120° C., in other embodiments less than 110° C., and in other embodiment from about 60° C. to about 80° C. $T_g$ may be determined according to ASTM D 341-88 by using differential scanning calorimetry. In these or other embodiments, the resulting grafted hydrocarbon resin may be characterized by a Saponification number (mg KOH/g resin material) of greater than 10, in other embodiments greater than 15, and in other embodiments greater than 19. In these or other embodiments, the resulting grafted hydrocarbon resin may be characterized by an acid number greater than 10, in other embodiments greater than 15, and in other embodiments greater than 20, and in other embodiments greater than 25.

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150% or less of their original length within about 10 minutes after being stretched to 200% of their original length and held at 200% of their original length for about 10 minutes.

Thus, in one or more embodiments, the thermoplastic vulcanizates can include at least about 25% by weight, in other embodiments at least about 45% by weight, in other embodiments at least about 65% by weight, and in other embodiments at least about 75% by weight rubber. In these or other embodiments, the amount of rubber within the thermoplastic vulcanizates can be from about 15% to about 90% by weight, in other embodiments from about 45% to about 85% by weight, and in other embodiments from about 60% to about 80% by weight, based on the entire weight of the rubber and thermoplastic combined, where the thermoplastic refers to all thermoplastic components of the thermoplastic phase including the propylene-α-olefin copolymer, the functionalized thermoplastic polymer, or any other thermoplastic polymer within the system.

In one or more embodiments, the amount of thermoplastic polymer (including all thermoplastic components such as the ethylene-propylene copolymer, the functionalized thermoplastic polymer, or any other thermoplastic polymer within the system) within the thermoplastic vulcanizates can be from about 10% to about 85% by weight, in other embodiments from about 15% to about 55% by weight and in other embodiments from about 20% to about 40%, based on the entire weight of the rubber and all thermoplastic components combined.

In one or more embodiments, the thermoplastic vulcanizates may include from about 3% to about 60% by weight, in other embodiments from about 7% to about 45% by weight, and in other embodiments from about 10% to about 30% by weight propylene-α-olefin thermoplastic copolymer based upon the total weight of the rubber and thermoplastic component combined. Stated with respect to the rubber, the thermoplastic vulcanizates of the present invention may include from about 5 to about 120 parts by weight, in other embodiments from about 15 to about 100 parts by weight, and in other embodiments from about 30 to about 80 parts by weight propylene-α-olefin thermoplastic copolymer per 100 parts by weight rubber.

In one or more embodiments, the thermoplastic vulcanizates include from about 3% to about 50% by weight, in other embodiments from about 5% to about 40% by weight, and in other embodiments from about 15% to about 30% by weight functionalized thermoplastic resin based upon the total weight of the rubber and thermoplastic component combined. Stated with respect to the rubber, the thermoplastic vulcanizates of the present invention include at least 10 parts by weight, in other embodiments at least 25 parts by weight, in other embodiments at least 40 parts by weight, and in other embodiments from about 55 parts to about 100 parts by weight functionalized thermoplastic polymer per 100 parts by weight rubber. In these or other embodiments, the thermoplastic vulcanizate includes from about 10 to about 90 parts by weight, in other embodiments from about 25 to about 80 parts by weight, and in other embodiments from about 40 to about 70 parts by weight functionalized thermoplastic polymer per 100 parts by weight rubber.

In one or more embodiments, the thermoplastic vulcanizates may include from about 0 to about 50% by weight, in other embodiments from about 5 to about 40% by weight, and in other embodiments from about 15 to about 30% by weight low-crystallinity thermoplastic resin based upon the total weight of the rubber and thermoplastic component combined. Stated with respect to the rubber, the thermoplastic vulcanizates of the present invention include at least 10 parts by weight, in other embodiments at least 25 parts by weight, in other embodiments at least 40 parts by weight, and in other embodiments at least 55 parts by weight low-crystallinity thermoplastic resin per 100 parts by weight rubber.

In those embodiments where the thermoplastic vulcanizates of this invention include a functionalized tackifier resin, the thermoplastic vulcanizates may include from about 0 to about 50 parts by weight, in other embodiments from about 7 to about 40 parts by weight, and in other embodiments from about 15 to about 35 parts by weight functionalized tackifier resin per 100 parts by weight rubber.

With respect to the oil, the thermoplastic vulcanizate may include from about 0 to about 250 parts by weight, or from about 50 to about 150 parts by weight, or from about 75 to about 130 parts by weight, of extender oil per 100 parts rubber. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable.

Fillers, such as carbon black, clay, talc, or calcium carbonate may be added in amount from about 1 to about 200, in other embodiments from about 2 to about 100, and in other embodiments from about 3 to about 50 parts by weight filler, per 100 parts by weight of rubber. The amount of carbon black that can be used may depend, at least in part, upon the type of carbon black and the amount of extender oil that is used.

In one or more embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic.

In one embodiment, the rubber can be simultaneously crosslinked and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers, Brabender mixers, continuous mixers, mixing extruders and the like. Methods for preparing thermoplastic vulcanizates are well known, as are methods employing low shear rates. Multiple-step processes can also be employed whereby ingredients, such as additional thermoplastic resin or tackifier resins, can be added after dynamic vulcanization has been achieved. The skilled artisan will be able to readily determine a sufficient or effective amount of vulcanizing agent to be employed without undue calculation or experimentation.

Any cure system that is capable of curing or crosslinking the rubber employed in preparing the thermoplastic vulcanizate may be used. For example, where the rubber includes an olefinic elastomeric copolymer, the cure system may include phenolic resins, free radical curatives, silicon-containing curatives, or other curatives conventionally employed in preparing thermosets.

In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend includes from about 25 to about 40% by weight octyl phenol and from about 75 to about 60% by weight nonylphenol, more preferably, the blend includes from about 30 to about 35 weight percent octyl phenol and from about 70 to about 65 weight percent nonylphenol. In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula

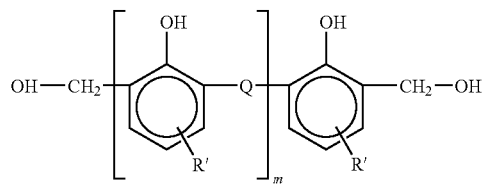

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 5 and R' is an organic radical having between 4 and 12 carbon atoms.

In one or more embodiments, the phenolic resin is used in conjunction with a halogen source, such as stannous chloride, and/or metal oxide or reducing compound such as zinc oxide.

Free-radical cure agents include peroxides such as organic peroxides. Examples of organic peroxides include, but are not limited to, di-tert-butyl peroxide, dicumyl peroxide, t-butyl-cumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used.

The free-radical curative may be used in conjunction with a coagent. Useful coagents include high-vinyl polydiene or polydiene copolymer, triallylcyanurate, triallyl isocyanurate, triallyl phosphate, sulfur, N-phenyl bis-maleamide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multifunctional acrylate esters, multi-functional methacrylate eaters or a combination thereof, or oximers such as quinone dioxime.

Silicon-containing cure systems may include silicon hydride compounds having at least two SiH groups. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Useful catalysts for hydrosilation include, but are not limited to, peroxide catalysts and catalysts including transition metals of Group VIII. These metals include, but are not limited to, palladium, rhodium, and platinum, as well as complexes of these metals.

Where butyl rubber is employed in preparing the thermoplastic vulcanizate, the cure systems may include phenolic resins, silicon-containing cure systems, zinc oxide systems, and amine systems.

In one or more embodiments, the rubber can be highly cured. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber has a degree of cure where not more than 10 weight percent, in other embodiments not more than 6 weight percent, in other embodiments not more than 5 weight percent, and in other embodiments not more than 3 weight percent is extractable by cyclohexane at 23° C. as described in U.S. Pat. Nos. 5,100,947 and 5,157,081, which are incorporated herein by reference for purpose of U.S. patent practice. Alternatively, in one or more embodiments, the rubber has a degree of cure (dynamically-cured in a preferred embodiment) such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., 68 RUBBER CHEMISTRY AND TECHNOLOGY 573-584 (1995).

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 μm, optionally less than 30 μm, optionally less than 10 μm, optionally less than 5 μm, and optionally less than 1 μm. In certain embodiments, at least 50%, optionally at least 60%, and optionally at least 75% of the particles have an average diameter of less than 5 μm, optionally less than 2 μm, and optionally less than 1 μm.

The thermoplastic vulcanizates of this invention may be advantageously characterized by an ability to bond or be overmolded to many surfaces or substrates. The thermoplastic vulcanizates of this invention may be used in numerous applications. The compositions can be applied to a substrate by using several techniques including, but not limited to, injection molding, extrusion and coextrusion, compression molding, overmolding including insert molding and two-shot molding, blow molding, welding, and thermo forming. In one or more embodiments, the compositions of this invention are employed as a hot melt adhesive.

The substrates to which the compositions can be adhered include numerous polar substrates. Exemplary polar substrates include metal substrates such as aluminum, magnesium, titanium, and copper. The substrates may also include, for example, metal alloys such as stainless steel, carbon steel, thixotropic magnesium (e.g., Thixomat™), and brass. Other polar substrates include, for example, polymeric polar substrates such as nylon (including polyamides, polyimides, and the like) and polycarbonates.

In one or more embodiments, the substrate to which the thermoplastic vulcanizates of this invention may be applied can be treated prior to application of the thermoplastic vulcanizate. Treatment of the substrate may include cleaning of the substrates such as by use of an organic solvent, or chemical treatment such as by way of a primer or compound that can change the characteristics of the surface of the substrate such as the level of oxidation. Other forms of treatment may include physical treatment such as by way of electron beam or annodization. In one or more embodiments, the thermoplastic vulcanizates of this invention may advantageously be applied to a substrate without the need to chemically treat or otherwise alter the chemical nature of the substrate. In one or more embodiments, the thermoplastic vulcanizates of this invention can be applied to a polar substrate, optionally after cleaning the surface of the substrate, but in the absence of any form of chemical treatment such that may alter the chemical nature of the surface of the substrate.

The thermoplastic vulcanizates of this invention may be useful in forming a number of articles or devices of commerce. For example, numerous articles and devices for consumer applications can be prepared. This may include grips or gripable surfaces on a number of consumer goods including, for example, kitchen utensils, tools, toothbrushes, pens and pencils, and athletic equipment. The thermoplastic vulcanizates may also be used in numerous damping applications such as in the formation of gaskets, bumpers, housings, and the like. The thermoplastic vulcanizates may also be useful in numerous industrial applications where it may be desirable to bond elastomeric materials to metal. These applications may include, for example, seals in the automotive and construction industries.

In order to demonstrate the practice of the present invention, the following examples have been prepared and tested. The examples should not, however, be viewed as limiting the scope of the invention. The claims will serve to define the invention.

EXAMPLES

Samples 1-3

Three thermoplastic vulcanizates were prepared and tested for various properties including adhesion. Each of the thermoplastic vulcanizates was prepared within a Brabender mixer using conventional procedures.

The ingredients common to each of the samples included 100 parts by weight rubber, 100 parts by weight oil, 12 parts by weight filler, 2 parts by weight zinc oxide, 3 parts by weight silicon-containing curative, and 2.5 parts by weight catalyst system. The rubber was poly(ethylene-co-propylene-co-5-vinyl-2-norbornene), which was oil extended in 100 phr oil, and characterized by a Mooney viscosity $ML_{(1+4)}$@ 125° C. of about 52, an ethylene mer content of about 63 weight percent, and a vinyl norbornene mer content of 0.7 weight percent. The filler was an anhydrous aluminum silicate obtained under the tradename ICECAP™ K. The silicon-containing curative was silicone hydride obtained under the tradename 2-5084 SIHI™ (Dow Corning). The catalyst was a 0.22 weight percent active platinum catalyst with a cyclic vinyl siloxane ligand in Paralux 6001R oil obtained under the tradename PC085™.

Table I sets forth the type and amount of thermoplastic resin employed in each sample, as well as the result of tests that were performed on each thermoplastic vulcanizate. The amounts provided in Table I are provided in parts by weight per 100 parts by weight rubber.

TABLE I

|  | Samples | | |
| --- | --- | --- | --- |
|  | 1 | 2 | 3 |
| Invention/Comparative | I | I | C |
| Functionalized Thermoplastic Polymer | 63.9 | 63.9 | 63.9 |
| Propylene-α-Olefin Copolymer | 85.2 | 149.1 | — |
| Polyolefin II | — | — | 85.2 |
| Polyolefin III | 63.9 | — | 63.9 |
| Shore A Hardness | 64 | 55 | 82.5 |
| Ultimate Tensile Strength (MPa) | 7.64 | 5.88 | 8.08 |
| Ultimate Elongation (%) | 699 | 746 | 511 |
| M100 (MPa) | 2.43 | 1.57 | 4.74 |
| Bond to Al (pli) kN/m | 12.32 | 7.39 | 4.4  5.28 |
| Bond to SS (pli) kN/m | 12.67 | 14.08 | 6.16  8.27 |

The Polyolefin II was an impact copolymer containing about 6.4 weight percent ethylene, and characterized by a crystallinity of about 25%, a flexural modulus of about 345 MPa, a melting point of about 120° C., an MFR at 230° C. and 2.16 kg load of about 5 dg/min, and was obtained under the tradename FINAEOD™ 94-21 (Fina).

The Polyolefin III was a polyolefin blend that was believed to include about 27 weight percent reactor copolymer and about 73% by weight of a high propylene impact copolymer, and was characterized by a flexural modulus of about 76 MPa, a Shore D hardness of about 41, a melting point of about 144° C., crystallinity of about 10-20%, MFR at 230° C. and 2.16 kg load of about 12 dg/min, and was obtained under the tradename ADFLEX™ KS359P (Basell).

The functionalized thermoplastic polymer was a grafted reactor copolymer including about 1% by weight pendent moieties deriving from maleic anhydride, and was characterized by a melt temperature of about 136° C., a melt index at 190° C. and 2.16 kg/load of about 450 dg/min, and was obtained under the tradename FUSABOND™ PMD353D.

The propylene-α-olefin copolymer was characterized by including at least 5% by weight ethylene, a heat of fusion, as determined by DSC, of about 6.4 J/g, a density of about 0.855, a MFR (2.16 kg @ 230° C.) of 3, a melt index (2.16 kg @ 190° C.) of 1.3, a melt temperature of about 46° C., and was obtained under the tradename VISTAMAXX™ 6100 (ExxonMobil).

Shore hardness was determined according to ISO 868 with a 15 second interval and/or per ASTM D-2240 with a 5 second time interval. Ultimate tensile strength, ultimate elongation, and 100% modulus (M100) were determined according to ASTM D-412 at 23EC by using an Instron testing machine. Weight gain was determined according to ASTM D-471. Tension set was determined according to ASTM D-412. All testing of Brabender-batch samples was performed on compression molded plaques; the thickness of the plaques was 1.5-2.0 mm. Adhesion to compression molded samples was measured by a peel test modeled after ASTM D-903-98. The only differences to this method were in sample preparation and conditioning. The compositions bonded to the metal substrates without the use of adhesives, and the samples were prepared by compression molding the adhesive compositions onto pre-cut strips of aluminum that were about 0.25 mm thick at a temperature of about 218° C. for about 5 minutes. The samples were conditioned for a minimum of 24 hours versus 7 days as specified by the ASTM D903-98 method. A first test was performed with aluminum plaques (Al), and the second was with stainless steel plaques (SS). Two data points were obtained for bonding on Sample 3. It is noted that bonding for Sample 3 to aluminum adhesively failed, where the other samples cohesively or partially cohesively failed.

The data in Table I shows that compositions according to the present invention are characterized by lower hardness and advantageous adhesion without a deleterious impact on mechanical properties.

Samples 4-6

Four additional thermoplastic vulcanizates were prepared and tested for adhesive properties. Each of the thermoplastic vulcanizates were prepared within a twin-screw extruder. Pellets of non-functionalized thermoplastic polyolefin (i.e., heterogeneous polyolefin or homogenous ethylene-propylene copolymer) were introduced with EPDM, clay, and zinc oxide to the extruder using a loss-in-weight belt feeder near the beginning of the extruder. As melt blending proceeded, the silicon hydride was added, followed by the addition of the platinum catalyst. The extrusion was set up to reach a melt temperature of about 180° C. to about 220° C. One extruder vent was used as a vacuum port to remove trace volatiles and to prevent porosity in the extruded composition. The compositions were finished into spherical pellets using an underwater pelletizer.

The ingredients common to each of the samples included 100 parts by weight rubber, 100 parts by weight oil, 12 parts by weight filler, 2 parts by weight zinc oxide, 3 parts by weight silicon-containing curative, and 2.5 parts by weight catalyst system. The rubber was poly(ethylene-co-propylene-co-5-vinyl-2-norbornene), which was oil extended in 100 phr oil, and characterized by a Mooney viscosity $ML_{(1+4)}$@ 125° C. of about 52, an ethylene mer content of about 63 weight percent, and a vinyl norbornene mer content of 0.7 weight percent. The filler was an anhydrous aluminum silicate obtained under the tradename ICECAP™ K. The silicon-containing curative was silicone hydride obtained under the tradename 2-5084 SIHI™ (Dow Corning). The catalyst was a 0.22 weight percent active platinum catalyst with a cyclic vinyl siloxane ligand in Paralux 6001R oil obtained under the tradename PC085™.

Table II sets forth the type and amount of thermoplastic resin employed in each sample, as well as the results of adhesion testing that was performed. The amounts provided in Table II are provided in parts by weight per 100 parts by weight rubber.

TABLE II

| | Samples | | |
|---|---|---|---|
| | 4 | 5 | 6 |
| Invention/Comparative | I | I | I |
| Functionalized Thermoplastic Polymer | 58 | 61 | 64 |
| Propylene-α-olefin Copolymer | 30 | 50 | 80 |
| Polyolefin IV | 40 | 40 | 40 |
| Tackifier Resin | 0 | 0 | 0 |
| Properties | | | |
| Bond to Al (pli) kN/m | 2.46 ± 0.5 | 2.62 ± 1.1 | 2.97 ± 0.3 |
| Bond to SS (pli) kN/m | 4.68 ± 0.6 | 3.78 ± 0.77 | 3.75 ± 0.47 |

The functionalized thermoplastic polymer and the propylene-1-olefin copolymer ethylene-propylene copolymer were the same as those employed in the previous samples. Polyolefin IV was a polyolefin blend that was believed to include about 27 weight percent reactor copolymer and about 73% by weight of a high propylene impact copolymer, and was characterized by a flexural modulus of about 76 MPa, a Shore D hardness of about 41, a melting point of about 144° C., crystallinity of about 10-20%, an MFR at 230° C. and 2.16 kg load of about 12 dg/min, and was obtained under the tradename ADFLEX™ V109F (Bassell).

Adhesion testing for Samples 4-8 was performed by injection molding the thermoplastic vulcanizate composition to either stainless steel (SS) or aluminum (AL). Specifically, adhesion for insert-molded samples was measured by a peel test modeled after ISO 813. The primary modification was in sample preparation because the thermoplastic composition was directly overmolded to the metal surface without the use of adhesive since adhesion can be obtained at the substrate interface (i.e., no separate adhesive layer exists). For evaluation of insert molding, the metal coupon was wiped with alcohol and pre-heated in an oven to a temperature of 125° C., and then placed in an insert mold with a heater directly behind the metal at a temperature of 125° C. Injection molding of the thermoplastic vulcanizate to the stainless steel occurred at 249° C., and adhesion to aluminum occurred at 238° C.

A standard tensometer was then used to measure peel values for the sample by clamping the edges of the metal coupon in a fixture and placing the end of the attached thermoplastic elastomer strip in the upper grip of the tensometer. The grips were then pulled apart at an angle 90°. The force to peel was plotted against the crosshead travel, which is also the peel length down the profile. The curve typically reached a peak and then descended to a plateau. The plateau values were recorded as the adhesion, expressed as kilo Newton per meter (kN/m).

The adhesion data provided for within Table II includes an average of three samples that were individually tested for bonding to stainless steel and an average of five samples for bonding to aluminum.

The data in Table II shows that the compositions of the present invention provide advantageous bonding over a wide range of use of the propylene-ethylene copolymer.

Various modifications and alterations that do not depart from the scope and spirit of this invention will become apparent to those skilled in the art. This invention is not to be duly limited to the illustrative embodiments set forth herein.

Aspects of the present invention can thus be described in one embodiment as (1) a thermoplastic vulcanizate comprising:

(i) a dynamically-cured rubber; and
(ii) a thermoplastic polymer component, where the thermoplastic polymer component includes (a) a propylene-α-olefin thermoplastic copolymer characterized by including at least 5% by weight up to 35% by weight units deriving from α-olefins, and having a heat of fusion, as determined by DSC, of less than 80 J/g, and (b) a functionalized thermoplastic polymer. Other aspects can also be described in combination with the following embodiments:

2. The thermoplastic vulcanizate of the above named embodiment, where the propylene-α-olefin copolymer is characterized by heat of fusion, as determined by DSC, of less than 70 J/g.
3. The thermoplastic vulcanizate of any of the preceding embodiments 1-2, where the propylene-α-olefin copolymer is further characterized by a crystallinity of less than 40%.
4. The thermoplastic vulcanizate of any of the preceding embodiments 1-3, where the propylene-α-olefin copolymer is further characterized by a crystallinity of from about 0.25 to about 25%.
5. The thermoplastic vulcanizate of any of the preceding embodiments 1-4, where the propylene-α-olefin copolymer is further characterized by a melt temperature of less than 110° C.
6. The thermoplastic vulcanizate of any of the preceding embodiments 1-5, where the propylene-α-olefin copolymer is further characterized by a melt temperature of less than 90° C.
7. The thermoplastic vulcanizate of any of the preceding embodiments 1-6, where the thermoplastic vulcanizate includes at least 10 parts by weight of the functionalized thermoplastic polymer per 100 parts by weight rubber.
8. The thermoplastic vulcanizate of any of the preceding embodiments 1-7, where the thermoplastic vulcanizate includes at least 25 parts by weight of the functionalized thermoplastic polymer per 100 parts by weight rubber.
9. The thermoplastic vulcanizate of any of the preceding embodiments 1-8, where the thermoplastic vulcanizate includes from about 3 to about 15% by weight functionalized thermoplastic resin based on the total weight of the rubber and thermoplastic component combined.
10. The thermoplastic vulcanizate of embodiment 9, where the functionalized thermoplastic polymer includes a maleated polypropylene polymer.
11. The thermoplastic vulcanizate of any of the preceding embodiments 9-10, where said functionalized thermoplastic polymer is a propylene-based polymer having a melt flow rate from about 20 to about 2,000 dg/min per ASTM D-1238 at 230° C. and 2.1 kg load.
12. The thermoplastic vulcanizate of any of the preceding embodiments 9-11, where said functionalized thermoplastic polymer includes at least 0.2% by weight functionalization.
13. The thermoplastic vulcanizate of any of the preceding embodiments 1-12, where the thermoplastic polymer component further includes a low-crystallinity thermoplastic resin.
14. The thermoplastic vulcanizate of embodiment 14, where the thermoplastic vulcanizate include at least 10 parts by weight low-crystallinity thermoplastic resin per 100 parts by weight rubber.
15. The thermoplastic vulcanizate of embodiment 13, where the thermoplastic vulcanizate includes from about 5 to about 40% by weight crystallinity based on the total weight of the rubber and thermoplastic component combined.
16. The thermoplastic vulcanizate of any of the preceding embodiments 1-15, where the thermoplastic vulcanizate includes from about 10 to about 85% by weight thermoplastic polymer based upon the total weight of the rubber and thermoplastic polymer component combined.
17. The thermoplastic vulcanizate of embodiment 16, where the thermoplastic vulcanizate includes from 3 to about 60% by weight propylene-α-olefin copolymer based on the total weight of the rubber and thermoplastic polymer component combined.
18. The thermoplastic vulcanizate of embodiment 16, where the thermoplastic vulcanizate includes from about 30 to about 80 parts by weight propylene-α-olefin copolymer per 100 parts by weight rubber.
19. The thermoplastic vulcanizate of any of the preceding embodiments 1-18, where the thermoplastic vulcanizate further comprises a functionalized hydrocarbon resin.
20. A method for preparing a thermoplastic vulcanizate of any of the preceding embodiments 1-19, the method comprising: dynamically vulcanizing a rubber within a mixture with a thermoplastic polymer component, where the thermoplastic polymer component includes (a) a propylene-α-olefin thermoplastic copolymer characterized by including at least 5% by weight up to 35% by weight units deriving from α-olefins, and having a heat of fusion, as determined by DSC, of less than 80 J/g, and (b) a functionalized thermoplastic polymer.

What is claimed is:

1. A thermoplastic vulcanizate comprising:
(i) a dynamically-cured rubber; and
(ii) a thermoplastic polymer component, where the thermoplastic polymer component includes (a) a propylene-α-olefin thermoplastic copolymer characterized by including at least 5% by weight up to 35% by weight units deriving from α-olefins, and having a heat of fusion, as determined by DSC, of less than 80 J/g, and (b) a functionalized thermoplastic polymer.

2. The thermoplastic vulcanizate of claim 1, where the propylene-α-olefin copolymer is characterized by heat of fusion, as determined by DSC, of less than 70 J/g.

3. The thermoplastic vulcanizate of claim 1, where the propylene-α-olefin copolymer is further characterized by a crystallinity of less than 40%.

4. The thermoplastic vulcanizate of claim 1, where the propylene-α-olefin copolymer is further characterized by a crystallinity of from about 0.25 to about 25%.

5. The thermoplastic vulcanizate of claim 2, where the propylene-α-olefin copolymer is further characterized by a melt temperature of less than 110° C.

6. The thermoplastic vulcanizate of claim 5, where the propylene-α-olefin copolymer is further characterized by a melt temperature of less than 90° C.

7. The thermoplastic vulcanizate of claim 1, where the thermoplastic vulcanizate includes at least 10 parts by weight of the functionalized thermoplastic polymer per 100 parts by weight rubber.

8. The thermoplastic vulcanizate of claim 1, where the thermoplastic vulcanizate includes at least 25 parts by weight of the functionalized thermoplastic polymer per 100 parts by weight rubber.

9. The thermoplastic vulcanizate of claim 1, where the thermoplastic vulcanizate includes from about 3 to about 15% by weight functionalized thermoplastic resin based on the total weight of the rubber and thermoplastic component combined.

10. The thermoplastic vulcanizate of claim 1, where the functionalized thermoplastic polymer includes a maleated polypropylene polymer.

11. The thermoplastic vulcanizate of claim 10, where said functionalized thermoplastic polymer is a propylene-based polymer having a melt flow rate from about 20 to about 2,000 dg/min per ASTM D-1238 at 230° C. and 2.1 kg load.

12. The thermoplastic vulcanizate of claim 11, where said functionalized thermoplastic polymer includes at least 0.2% by weight functionalization.

13. The thermoplastic vulcanizate of claim 1, where the thermoplastic polymer component further includes a low-crystallinity thermoplastic resin.

14. The thermoplastic vulcanizate of claim 1, where the thermoplastic vulcanizate include at least 10 parts by weight low-crystallinity thermoplastic resin per 100 parts by weight rubber.

15. The thermoplastic vulcanizate of claim 13, where the thermoplastic vulcanizate includes from about 5 to about 40% by weight of the low-crystallinity thermoplastic resin based on the total weight of the rubber and thermoplastic component combined.

16. The thermoplastic vulcanizate of claim 1, where the thermoplastic vulcanizate includes from about 10 to about 85% by weight thermoplastic polymer based upon the total weight of the rubber and thermoplastic polymer component combined.

17. The thermoplastic vulcanizate of claim 16, where the thermoplastic vulcanizate includes from 3 to about 60% by weight propylene-α-olefin copolymer based on the total weight of the rubber and thermoplastic polymer component combined.

18. The thermoplastic vulcanizate of claim 16, where the thermoplastic vulcanizate includes from about 30 to about 80 parts by weight propylene-α-olefin copolymer per 100 parts by weight rubber.

19. The thermoplastic vulcanizate of claim 1, where the thermoplastic vulcanizate further comprises a functionalized hydrocarbon resin.

20. A method for preparing a thermoplastic vulcanizate, the method comprising:

dynamically vulcanizing a rubber within a mixture with a thermoplastic polymer component, where the thermoplastic polymer component includes (a) a propylene-α-olefin thermoplastic copolymer characterized by including at least 5% by weight up to 35% by weight units deriving from α-olefins, and having a heat of fusion, as determined by DSC, of less than 80 J/g, and (b) a functionalized thermoplastic polymer.

21. A thermoplastic vulcanizate comprising:
(i) a dynamically-cured rubber; and
(ii) a thermoplastic polymer component, where the thermoplastic polymer component includes (a) a propylene-α- olefin thermoplastic copolymer characterized by including at least 5% by weight up to 35% by weight units deriving from α-olefins, and having a heat of fusion, as determined by DSC, of less than 80 J/g; (b) from about 3 to about 15% by weight of a functionalized thermoplastic resin, based on the total weight of the rubber and thermoplastic rubber and thermoplastic component combined; and (c) from about 5 to about 40% by weight of a the low-crystallinity thermoplastic resin based on the total weight of the rubber and thermoplastic component combined.

22. The thermoplastic vulcanizate of claim 21, where the rubber is a copolymer of ethylene, propylene, and a diene.

23. The thermoplastic vulcanizate of claim 22, where the diene is 5-vinyl-2-norbornene.

24. The thermoplastic vulcanizate of claim 21, where the rubber is cured with a silicon-containing curative.

25. The thermoplastic vulcanizate of claim 21, where the thermoplastic vulcanizate is characterized by a Shore A hardness (ISO 868) of 55 to 64.

26. The thermoplastic vulcanizate of claim 21, where the thermoplastic vulcanizate is characterized by adhesive properties sufficient to achieve a bond strength to aluminium of 2.46 kN/m pursuant to ASTM D-903-98 (conditioning for 24 hours) without the use of adhesive and by compression molding the thermoplastic vulcanizates to the aluminium.

* * * * *